United States Patent
Watanabe

(10) Patent No.: US 6,770,590 B2
(45) Date of Patent: Aug. 3, 2004

(54) EXHAUST GAS EMISSION PURIFYING CATALYST

(75) Inventor: Tetsuya Watanabe, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 48 days.

(21) Appl. No.: 10/163,494

(22) Filed: Jun. 7, 2002

(65) Prior Publication Data

US 2003/0008773 A1 Jan. 9, 2003

(30) Foreign Application Priority Data

Jun. 8, 2001 (JP) ........................................ 2001-174469

(51) Int. Cl.[7] .................... B01J 27/185; B01J 27/182; B01J 21/08; B01J 21/12; B01J 23/58
(52) U.S. Cl. .................... 502/328; 502/213; 502/214; 502/241; 502/242; 502/260; 502/261; 502/262; 502/313; 502/314; 502/316; 502/317; 502/330; 502/333; 502/334; 502/336; 502/338; 502/339; 502/349; 502/407; 502/415; 502/439; 502/527.12; 502/527.13
(58) Field of Search ................ 502/241, 242, 502/252, 260, 261, 262, 328, 330, 333, 334, 336, 338, 339, 341, 349, 355, 407, 415, 439, 527.12, 527.13, 213, 214, 313–314, 316, 317

(56) References Cited

U.S. PATENT DOCUMENTS

| | | | | | |
|---|---|---|---|---|---|
| 4,171,287 A | * | 10/1979 | Keith | ........................ | 252/462 |
| 5,409,671 A | * | 4/1995 | Takemoto et al. | .......... | 422/180 |
| 5,494,878 A | * | 2/1996 | Murakami et al. | .......... | 502/304 |
| 5,762,892 A | * | 6/1998 | Kasahara et al. | ......... | 423/213.5 |
| 5,811,064 A | * | 9/1998 | Kojima et al. | .............. | 422/180 |
| 5,911,960 A | * | 6/1999 | Miyoshi et al. | .......... | 423/213.5 |
| 5,948,376 A | * | 9/1999 | Miyoshi et al. | .......... | 423/213.5 |
| 6,022,825 A | * | 2/2000 | Andersen et al. | ........... | 502/303 |
| 6,066,587 A | * | 5/2000 | Kurokawa et al. | ............ | 502/66 |
| 6,159,897 A | * | 12/2000 | Suzuki et al. | ............... | 502/351 |
| 6,348,430 B1 | * | 2/2002 | Lindner et al. | ............. | 502/304 |
| 6,395,675 B1 | * | 5/2002 | Suga et al. | ................. | 502/326 |
| 6,420,306 B2 | * | 7/2002 | Kurokawa et al. | .......... | 502/261 |
| 6,426,316 B2 | * | 7/2002 | Tanaka et al. | ............. | 502/340 |
| 6,432,859 B1 | * | 8/2002 | Iwakuni et al. | ............... | 502/66 |
| 6,479,428 B1 | * | 11/2002 | Tonkovich et al. | ......... | 502/302 |
| 6,514,905 B1 | * | 2/2003 | Hanaki et al. | ............. | 502/328 |
| 6,534,438 B1 | * | 3/2003 | Baker et al. | ................ | 502/325 |
| 6,537,946 B1 | * | 3/2003 | Tanada et al. | ............. | 502/344 |

FOREIGN PATENT DOCUMENTS

| | | |
|---|---|---|
| JP | 9-85092 A | 3/1997 |
| JP | 2000-24499 A | 1/2000 |
| JP | 2000-279810 A | 10/2000 |
| JP | 2001-129402 A | 5/2001 |

* cited by examiner

*Primary Examiner*—Cam N. Nguyen
(74) *Attorney, Agent, or Firm*—Birch, Stewart, Kolasch & Birch, LLP

(57) ABSTRACT

An exhaust gas emission purifying catalyst has a catalyst layer (20) supported on a carrier (10). The catalyst layer includes a composite oxide, in which noble metals and occluding agents are mixed in order to inhibit the movement of the occluding agents even at high temperatures and to prevent deterioration of the purifying performance of the catalyst after operation at a high temperature. The composite oxide is comprised of silicon (Si) and at least one of cobalt (Co), zirconium (Zr), iron (Fe), and manganese (Mn).

16 Claims, 5 Drawing Sheets

EXHAUST GAS EMISSION PURIFYING CATALYST

BACKGROUND OF THE INVENTION

This non-provisional application claims priority under 35 U.S.C. §119 (a) on Patent Application No. 2001-174469 filed in Japan on Jun. 8, 2001, which is herein incorporated by reference.

1. Field of the Invention

The present invention relates to an exhaust emission purifying catalyst, and more particularly to an exhaust gas emission control catalyst with excellent durability and exhaust gas emission control capability.

2. Description of Related Art

In a lean combustion type engine such as a lean burn engine and a direct injection type engine, a three-way catalyst cannot exhibit satisfactory exhaust gas emission purifying performance during operation at a lean air-fuel ratio. To address this problem, a NOx occluding catalyst constructed such that a catalyst layer, to which is added an occluding agent, is supported on a cordierite carrier is installed in such an engine. However, in the NOx occluding catalyst, and more particularly in a catalyst with an alkali metal added thereto as an occluding agent, the occluding agent splashes or moves into the cordierite carrier at high temperatures to cause a decrease in the occluding agent. This deteriorates the NOx occluding performance of the catalyst.

Therefore, applicant of the present invention has proposed a catalyst to which zeolite is added so as to inhibit the occluding agent from splashing or moving into a carrier in Japanese Laid-Open Patent Publication (Kokai) No. 2001-129402.

However, if such a catalyst is operated at a very high temperature, the NOx occluding performance thereof is deteriorated thereafter. Therefore, there has been required a catalyst whose performance deterioration is small even after operation at a high temperature.

SUMMARY OF THE INVENTION

It is therefore an object of the present invention to provide an exhaust gas emission purifying catalyst which can withstand high temperatures.

To attain the above object, the present invention provides an exhaust gas emission purifying catalyst comprising: a carrier; and a catalyst layer to which at least one metal selected from a group consisting of alkali metals and alkali earth metals is added as an occluding agent; wherein a composite oxide including silicon (Si) and at least one metal selected from a transition metal group consisting of cobalt (Co), zirconium (Zr), iron (Fe), and manganese (Mn) is mixed in the catalyst layer.

Since the transition metals such as Co, Zr, Fe, and Mn have a high fusing point, the composite oxide of such transition metals and Si exhibit a high thermal stability. Thus, the occluding agent movement inhibiting capability of the Si in the composite oxide and the occluding function of the occluding agent are maintained even at high temperatures. Namely, the catalyst, in which is mixed the composite oxide comprised of the transition metals and the silicon, have a high capability to withstand heat, and thus, the excellent occluding performance of the catalyst can be maintained even after operation at a high temperature.

BRIEF DESCRIPTION OF DRAWINGS

The nature of this invention, as well as other objects and advantages thereof, will be explained in the following with reference to the accompanying drawings, in which like references designate the same or similar parts throughout the figures and wherein.

DETAILED DESCRIPTION OF THE PREFERRED EMBODIMENTS

A description will now be given of an exhaust gas emission purifying catalyst according to a first embodiment of the present invention.

Figure 1:
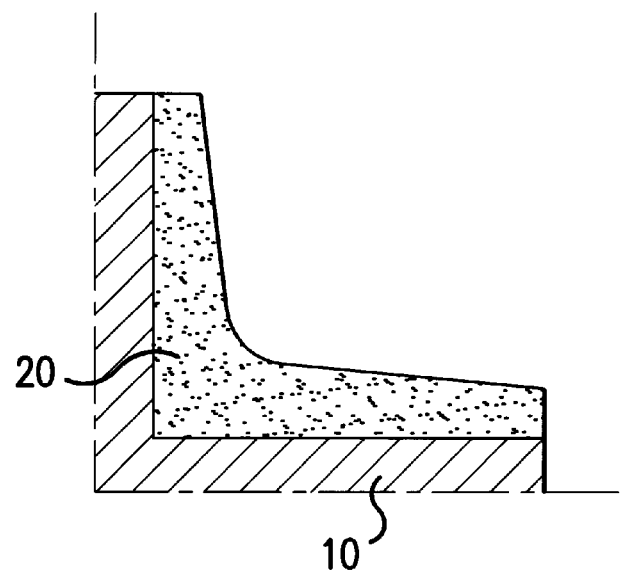
FIG. 1 is a partial enlarged sectional view showing a quarter of one cell of an exhaust gas emission purifying catalyst according to a first embodiment of the present invention.

The exhaust gas emission purifying catalyst according to the present embodiment is implemented by a NOx catalyst including a honeycomb (monolith) type cordierite carrier comprised of many cells. FIG. 1 illustrates a part of one cell of the cordierite carrier 10 that is quadrangle-shaped, for example. The surface of the cordierite carrier 10 supports a catalyst layer 20. Noble metals such as platinum (Pt) and palladium (Pd), and NOx occluding agents such as potassium (K) and barium (B) are added to the catalyst layer 20, and a composite oxide comprised of silicon (Si) and at least one metal selected from a transition metal group consisting of cobalt (Co), zirconium (Zr), iron (Fe), and manganese (Mn) is mixed in the catalyst layer 20. In this embodiment, zirconium silicate ($ZrSiO_4$) is used as the composite oxide.

Preferably, the respective quantities of the platinum and the palladium to be supported by 1 liter of the carrier are set to 0.1 to 10 g, the respective quantities of the potassium and the barium to be supported by 1 liter of the carrier are set to 0.1 to 50 g, and the quantity of the zirconium silicate to be supported by 1 liter of the carrier is set to 0.1 to 50 g.

The cordierite carrier 10 is formed by dispersing alumina powders, silica powders, and magnesia powders, which are mixed such that the ratios of alumina, silica, and magnesia correspond to the composition of the cordierite, in water, forming a honeycomb compact from a solid content thereof, and sintering the honeycomb compact.

The catalyst layer 20 is supported on the surface of the cordierite carrier 10 as described below, for example.

First, a slurry including powders comprised mainly of noble metals such as platinum, alkali metals such as potassium, alkali earth metals such as barium, and zirconium silicate as a composite oxide is prepared. The cordierite carrier 10 is dipped in the slurry, and is then dried and sintered.

This results in a NOx catalyst with the catalyst layer 20 coated on the cordierite carrier 10. The NOx catalyst is stored in a case via a cushioning material, and is disposed in an exhaust pipe of a lean burn internal combustion engine.

In this NOx catalyst, NOx in exhaust gas during operation of the internal combustion engine at a lean air-fuel ratio is occluded in the form of nitrate by catalysts dispersed in the catalyst layer 20. During operation of the internal combustion engine at a rich air-fuel ratio, the nitrate is dissolved to reduce the occluded NOx into nitrogen. The nitrogen is emitted from the NOx catalyst into the atmosphere.

If a conventional NOx catalyst is exposed to a high temperature for a long period of time, occluding agents such as potassium added to a catalyst layer usually move into a cordierite carrier to react on silicon or the like therein to generate a chemical compound that will cause a crack in the cordierite carrier. In the case of the NOx catalyst according to the present embodiment, however, the occluding agents such as potassium in the catalyst layer 20 are held in proximity to silicon (Si) included in the zirconium silicate to inhibit the occluding agents such as potassium in the catalyst layer from moving into the cordierite carrier 10, thus preventing a crack.

Further, in the conventional catalyst having the catalyst layer in which is mixed zeolite having an occluding agent movement inhibiting capability, the NOx emission purifying efficiency is lowered after operation at a high temperature since the bond of $SiO_2$ and $Al_2O_3$ as components of the catalyst is loosened at a very high temperature to dissipate occluding agents. In the case of the NOx catalyst according to the present embodiment, however, the composite oxide comprised of the zirconium silicate and the silicon mixed in the catalyst layer exhibits a high thermal stability, and a high occluding agent movement inhibiting capability of the silicon in the composite oxide is maintained even at a high temperature in excess of 850° C., for example, thus exhibiting an excellent NOx emission purifying efficiency even after operation at a high temperature.

Figure 2:
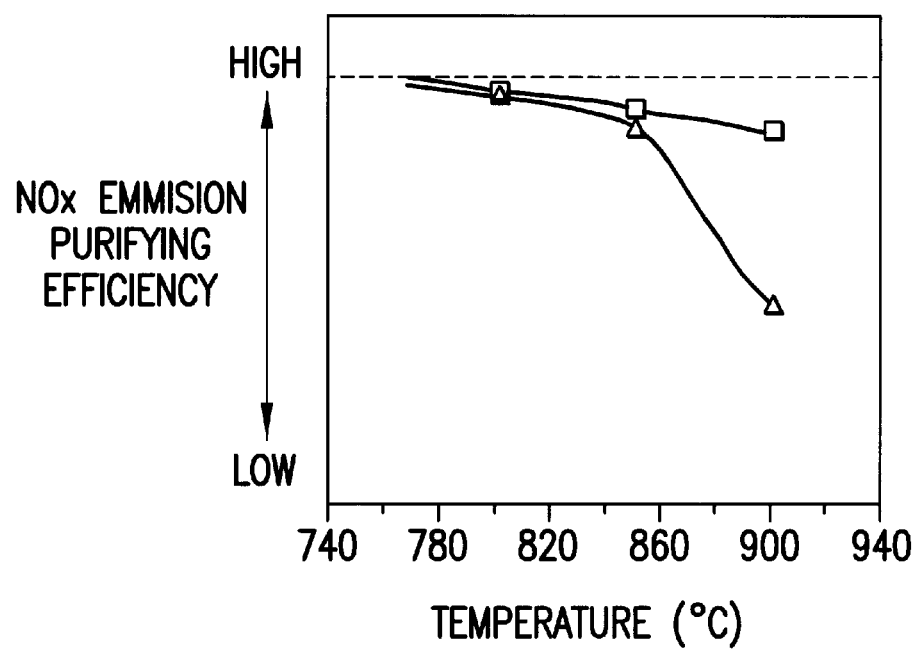
FIG. 2 is a graph showing the NOx emission purifying efficiency of an exhaust gas emission purifying catalyst having a catalyst layer comprised of zirconium silicate and a conventional exhaust gas emission purifying catalyst having a catalyst layer comprised of zeolite after withstanding heat, with respect to breakdown temperatures.
Figure 3:
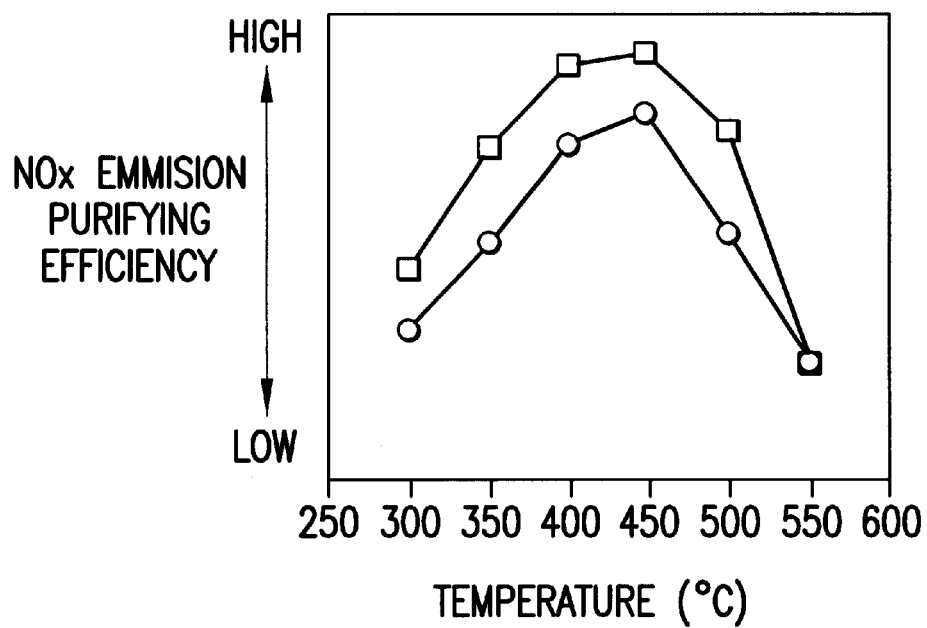
FIG. 3 is a graph showing the underfloor inlet temperature-NOx emission purifying efficiency characteristic of the exhaust gas emission purifying catalyst with the catalyst layer comprised of zirconium silicate after withstanding heat, as compared with the characteristic of conventional exhaust gas emission purifying catalyst.

To confirm the operation and effects as described above, the inventor of the present invention measured the NOx emission purifying efficiency of the NOx catalyst according to the present embodiment having the catalyst layer in which is mixed the composite oxide comprised of the zirconium silicate and the silicon, and the conventional NOx catalyst in which is mixed zeolite after a heat endurance test. FIGS. 2 and 3 illustrate the results of the measurement.

FIG. 2 shows the relationship between the temperature (catalyst temperature in a heat endurance test) and the NOx emission purifying efficiency, i.e. the catalyst temperature-NOx emission purifying efficiency characteristics of the catalyst. The reference temperature is 500° C. In FIG. 2, a quadrangle mark indicates the characteristics of the catalyst according to the present embodiment, a triangle mark indicates the characteristics of the conventional catalyst, and a broken line indicates the characteristics of a new catalyst (before deterioration). As is clear from FIG. 2, there is little difference between the catalyst according to the present embodiment and the conventional catalyst in the NOx emission purifying efficiency after the heat endurance test at a temperature in proximity to 800° C. and 850° C., but the catalyst according to the present embodiment exhibits a higher NOx emission purifying efficiency than the conventional catalyst after the heat endurance test at a temperature in proximity to 900° C. This indicates that the catalyst according to the present embodiment exhibits a high purifying efficiency even after operation at a high temperature.

FIG. 3 shows the relationship between the underfloor catalyst inlet temperature and the NOx emission purifying efficiency of the catalyst according to the present embodiment implemented by an underfloor catalyst and the conventional catalyst after a heat endurance test is carried out at 850° C. for twenty hours. In FIG. 3, a quadrangular mark indicates the characteristics of the catalyst according to the present embodiment, and a circular mark indicates the characteristics of the conventional catalyst. As shown in FIG. 3, the catalyst according to the present embodiment exhibits a higher NOx emission purifying efficiency after the heat endurance test as compared with the conventional catalyst except the case where the underfloor catalyst inlet temperature is 550° C. Therefore, the catalyst according to the present embodiment exhibits an excellent purifying efficiency at an underfloor catalyst inlet temperature of 400 to 450° C. at which an actual vehicle is normally operated.

As is clear from the experiment results shown in FIGS. 2 and 3, the catalyst according to the present embodiment maintains a high purifying efficiency even after operation at a high temperature.

A description will now be given of an exhaust gas emission purifying catalyst according to a second embodiment of the present invention.

The catalyst according to the present embodiment is intended to maintain a favorable NOx occluding/purifying performance and improve the heat resisting capability, and the structure thereof is identical with that of the first embodiment shown in FIG. 1 except that a second catalyst layer 30 is formed over the catalyst layer (hereinafter referred to as a "first catalyst layer") 20, e.g. on the outer surface of the first catalyst layer 20.

Figure 4:
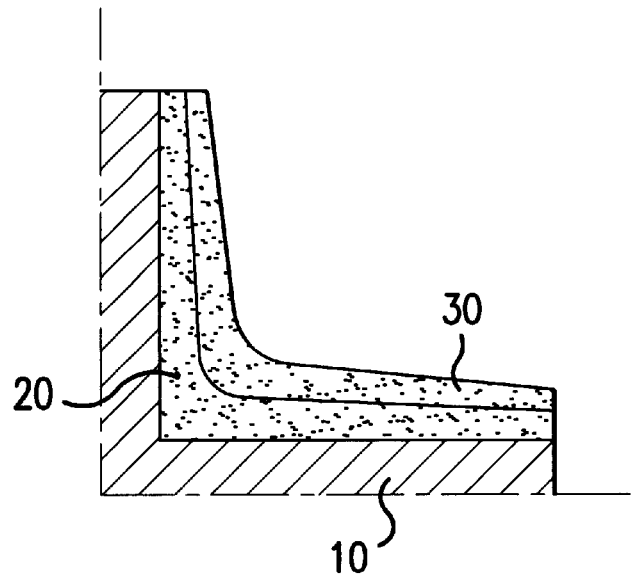
FIG. 4 is a sectional view showing a quarter of one cell of an exhaust gas emission purifying catalyst according to a second embodiment of the present invention.

Referring to FIG. 4, the exhaust gas emission purifying catalyst according to the present embodiment is comprised of the cordierite carrier 10, the first catalyst layer 20 supported on the surface of the cordierite carrier 10 that includes noble metals, occluding agents, and a composite oxide, and the second catalyst layer 30 formed over the first catalyst layer 20, e.g. on the surface of the first catalyst layer 20. The structures of the carrier 10 and the first catalyst layer 20 are identical to those of the first embodiment, and a description thereof is omitted herein. The second catalyst layer 30 is different from the first catalyst layer 20 in that the second catalyst layer 30 is formed of a mixture of noble metals such as platinum and NOx occluding agents such as potassium and barium but includes no composite oxide.

The exhaust gas emission purifying catalyst constructed in the above-mentioned manner is manufactured by the same procedure as in the first embodiment. Specifically, the cordierite carrier 10 is dipped in a slurry including noble metals and NOx occluding agents, and is then dried and sintered.

As stated previously, the NOx occluding agents having a high electron donating property lower the oxidizing capability of the noble metals, and this deteriorates the NOx occluding/purifying performance of the catalyst. The catalyst layer of the catalyst according to the present embodiment, however, is comprised of the first catalyst layer 20 including the composite oxide and the second catalyst layer 30 formed on the outer surface of the first catalyst layer 20 and includes no composite oxide, and thus, the NOx occluding agents in the second catalyst layer 30 easily move toward the first catalyst layer 20. This results in a decrease in the amount of the occluding agents in the second catalyst layer 30 since the occluding agents are concentrated in the first catalyst layer 20. As a result, the oxidizing capability of the noble metals in the second catalyst layer is not easily weakened by the occluding agents in the second catalyst layer 30, and this maintains a high oxidizing capability of the noble metals in the second catalyst layer 30 and a high occluding/purifying performance of the catalyst. Further, due to the decrease in the amount of the occluding agents in the second catalyst layer 30, the occluding agents are prevented from splashing from the second catalyst layer 30, so that a favorable occluding performance of the catalyst can be maintained. In other respects, the other operation and effects of the present embodiment are identical to those of the first embodiment, and therefore, a description thereof is omitted herein.

A description will now be given of an exhaust gas emission purifying catalyst according to a third embodiment of the present invention.

The structure of the catalyst according to the present embodiment is identical to that of the second embodiment in FIG. 4, except that a second catalyst layer 30 is formed between a cordierite carrier 10 and a first catalyst layer 20.

Figure 5:
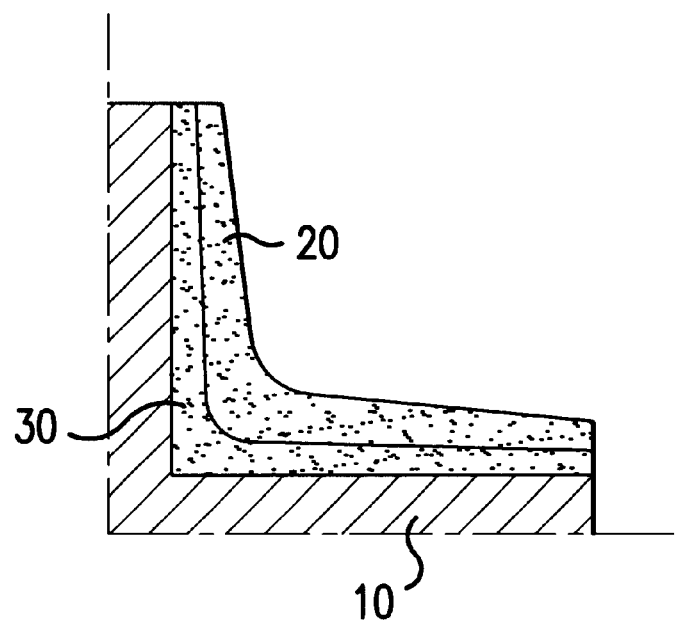
FIG. 5 is a sectional view showing a quarter of one cell of an exhaust gas emission purifying catalyst according to a third embodiment of the present invention.

Specifically, as shown in FIG. 5, the exhaust gas emission purifying catalyst according to the present embodiment is comprised of the cordierite carrier 10, the second catalyst layer 30 including noble metals and NOx occluding agents, and the first catalyst layer 20 formed on the surface of the second catalyst layer 30, and includes noble metals, occluding agents, and a composite oxide. The structures of the carrier 10, the first catalyst layer 20, and the second catalyst layer 30 according to the present embodiment are identical to those of the second embodiment, and therefore, a description thereof is omitted herein.

The exhaust gas emission purifying catalyst constructed in the above-mentioned manner is manufactured by dipping the cordierite carrier 10 supporting the second catalyst layer 30 in a slurry including noble metals, NOx occluding agents, and a composite oxide, and then drying and sintering the cordierite carrier 10.

In the exhaust gas emission purifying catalyst according to the present embodiment, the occluding agents added to the second catalyst layer 30 formed between the first catalyst layer 20 and the cordierite carrier 10 is pulled by silicon in the composite oxide mixed in the first catalyst layer 20, so that the occluding agents are concentrated in the first catalyst layer 20 which is likely to be brought into contact with exhaust gas. Therefore, even when the air-fuel ratio of the exhaust gas becomes richer, the occluding performance of the exhaust gas purifying catalyst is efficiently recovered, and the deterioration of the fuel economy caused by the rich air-fuel ratio can be minimized. Further, the oxidizing capability of the noble metals in the second catalyst layer 30 can be inhibited from being lowered by the occluding agents, and therefore, a high occluding/purifying capability of the exhaust gas purifying catalyst can be maintained. In other respects, the present embodiment is identical to the first and second embodiments.

A description will now be given of an exhaust gas purifying catalyst according to a fourth embodiment of the present invention.

The structure of the catalyst according to the present embodiment is identical to that of the first embodiment in FIG. 1, except that a three-way catalyst layer is formed on the outer surface of a catalyst layer.

Figure 6:
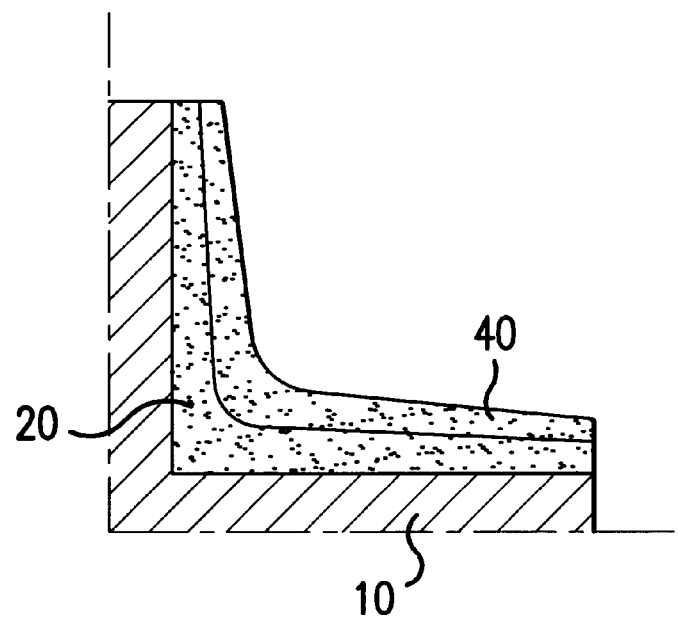
FIG. 6 is a sectional view showing a quarter of one cell of an exhaust gas emission purifying catalyst according to a fourth embodiment of the present invention.

As shown in FIG. 6, the exhaust gas emission purifying catalyst according to the present embodiment is comprised of a cordierite carrier 10, a catalyst layer 20 formed on the surface of the carrier 10 and includes noble metals, occluding agents, and a composite oxide, and a three-way catalyst layer 40 formed on the surface of the catalyst layer 20 and functions mainly as a three-way catalyst. In this embodiment, an acid material, serving as an effect inhibiting material, is mixed in the three-way catalyst layer 40 in order to alleviate an adversary effect of the occluding agents having reached the three-way catalyst layer 40 on the three-way catalyst layer 40. Specifically, the effect inhibiting material alleviates such an adversary effect that the occluding agents lower the CO and HC occluding capability of noble metals in the three-way catalyst layer 40 or covers the surface of the noble metals. Examples of such acid materials are silica ($SiO_2$), tungsten (W), and phosphorous (P) that react on the occluding agents as alkali salt to generate stable substances. On the other hand, no occluding agent is added to the three-way catalyst layer 40 to achieve a favorable three-way catalyst performance.

The exhaust gas emission purifying catalyst constructed in the above-mentioned manner is manufactured by the same procedure as in the first embodiment. Specifically, the cordierite carrier 10 supporting the first catalyst layer 20 is dipped in a slurry including noble metals such as platinum (Pt), palladium (Pd), and rhodium (Rh) and an acid material, and is then dried and sintered.

A description will now be given of the operation of the exhaust gas emission purifying catalyst that is constructed in the above-mentioned manner.

In the catalyst layer 20, the occluding agents are fixed around the silicon in the composite oxide so as to inhibit the occluding agents from splashing at high temperatures or moving into the cordierite carrier 10 and the three-way catalyst layer 40.

If the occluding agents reach the three-way catalyst layer 40 in spite of such a movement inhibiting action, the occluding agents react with the acid material in the three-way catalyst layer 40 and are changed into stable substances such as potassium phosphate. This alleviates the adversary effect of the occluding agents on the three-way catalyst layer 40. According to the present embodiment, the catalyst layer 20 and the three-way catalyst layer 40 can be formed as a single catalyst on the common carrier 10 to reduce the cost. Further, in the exhaust gas emission purifying catalyst, the catalyst layer 20 has a high NOx occluding capability and the three-way catalyst layer 40 exhibits an excellent three-way catalyst performance. Therefore, the NOx emission can be surely purified during operation at a lean air-fuel ratio, and the three-way catalyst layer 40 can purify CO and HC generated during operation at a stoichiometrical air-fuel ratio or a rich air-fuel ratio. In other respects, the present embodiment is identical to the first embodiment.

A description will now be given of an exhaust gas emission purifying catalyst according to a fifth embodiment of the present invention.

The structure of the catalyst according to the present embodiment is identical to that of the fifth embodiment in FIG. 6, except that a three-way catalyst layer is formed between a cordierite carrier and a catalyst layer.

Figure 7:
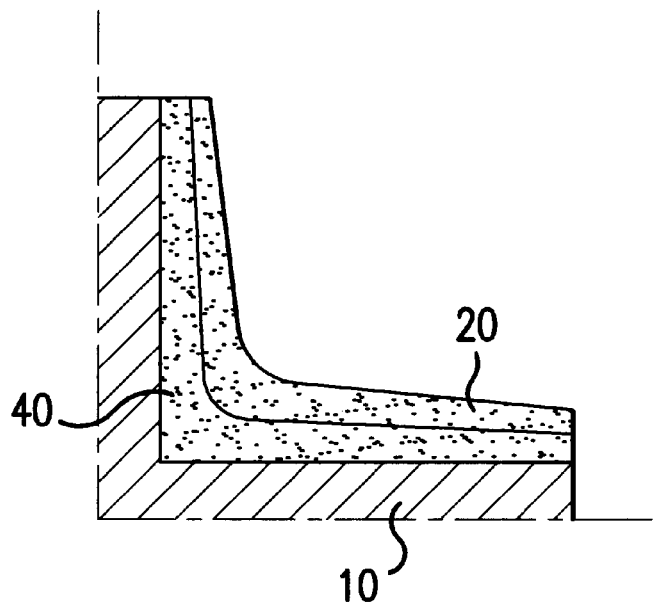
FIG. 7 is a sectional view showing a quarter of one cell of an exhaust gas emission purifying catalyst according to a fifth embodiment of the present invention.

Specifically, as shown in FIG. 7, the exhaust gas emission purifying catalyst according to the present embodiment is comprised of a cordierite carrier 10, a three-way catalyst layer 40 supported on the surface of the carrier 10, and a catalyst layer 20 formed on the surface of the three-way catalyst layer 40. The exhaust gas emission purifying catalyst according to the present embodiment is manufactured by dipping the cordierite carrier 10 supporting the catalyst layer 20 in a slurry including noble metals and an effect inhibiting material such as an acid material, and then drying and sintering the cordierite carrier 10.

In the exhaust gas emission purifying catalyst according to the present embodiment, the catalyst layer 20 operates to purify NOx emission and the three-way catalyst layer 40 operates to purify exhaust gas emission during operation at a stoichiometrical or rich air-fuel ratio. In the catalyst layer 20, the occluding agents are fixed around the silicon in the composite oxide so as to inhibit the occluding agents from splashing or moving into the cordierite carrier 10 and the three-way catalyst layer 40 at high temperatures. If the occluding agents reach the three-way catalyst layer 40, the occluding agents react with the acid material in the three-way catalyst layer 40 and are changed into stable substances to alleviate the adversary effect of the occluding agents on the three-way catalyst layer 40. In other respects, the present embodiment is identical with the first embodiment.

A description will now be given of an exhaust gas emission purifying catalyst according to a sixth embodiment of the present invention.

The sixth embodiment is different from the first embodiment in which the composite oxide is mixed in the catalyst layer, in that an occluding agent movement inhibiting layer (hereinafter referred to as an "inhibiting layer") including a composite oxide is formed over a catalyst layer including no composite oxide so that the stratified inhibiting layer can surely inhibit occluding agents from splashing from the catalyst layer.

Figure 8:
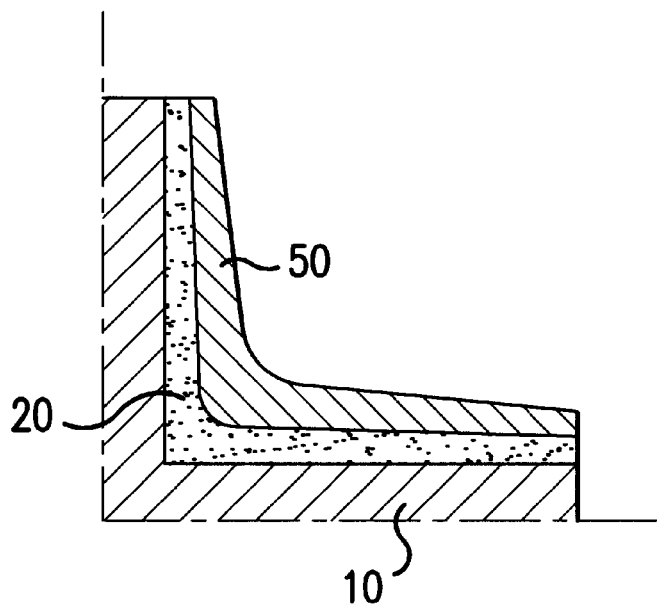
FIG. 8 is a sectional view showing a quarter of one cell of an exhaust gas emission purifying catalyst according to a sixth embodiment of the present invention.

As shown in FIG. 8, the exhaust gas emission purifying catalyst according to the present embodiment is comprised of a cordierite carrier 10, a catalyst layer 20 supported on the outer surface of the carrier 10, and an inhibiting layer 50 formed over the catalyst layer 20, e.g. on the outer surface of the catalyst layer 20. The inhibiting layer 50 includes a composite oxide, such as zirconium silicate, comprised of silicon and at least one of cobalt, zirconium, iron, and manganese.

The exhaust gas emission purifying catalyst is manufactured as described below, for example. First, the cordierite carrier 10 is dipped in a slurry including powders comprised mainly of noble metals such as platinum and occluding agents such as potassium and barium, and is then dried and sintered. Further, the cordierite carrier 10 is dipped in a slurry including powders comprised mainly of zirconium silicate, and is then dried and sintered. The resulting exhaust gas emission purifying catalyst is stored in a case via a cushioning material, and is disposed in an exhaust pipe of an internal combustion engine.

When the exhaust gas emission purifying catalyst is used, silicon in the zirconium silicate included in the inhibiting layer 50 holds the occluding agents in proximity to the silicon. Since the zirconium silicate exhibits a high thermal stability and a high occluding agent movement inhibiting performance of the inhibiting layer 50 is maintained even at high temperatures, the inhibiting layer 50 surely inhibits the movement of the occluding agents even in the case where the movement of the occluding agents is facilitated in the catalyst due to exposure of the catalyst to a high temperature. This prevents the occluding agents from dissipating due to evaporation and splash from the catalyst, and maintains a high occluding capability after operation at a high temperature.

A description will now be given of an exhaust gas emission purifying catalyst according to a seventh embodiment of the present invention.

The structure of the catalyst according to the present embodiment is different from the sixth embodiment, in which the inhibiting layer is formed over the catalyst layer, in that an inhibiting layer is formed between a carrier and a catalyst layer.

Figure 9:
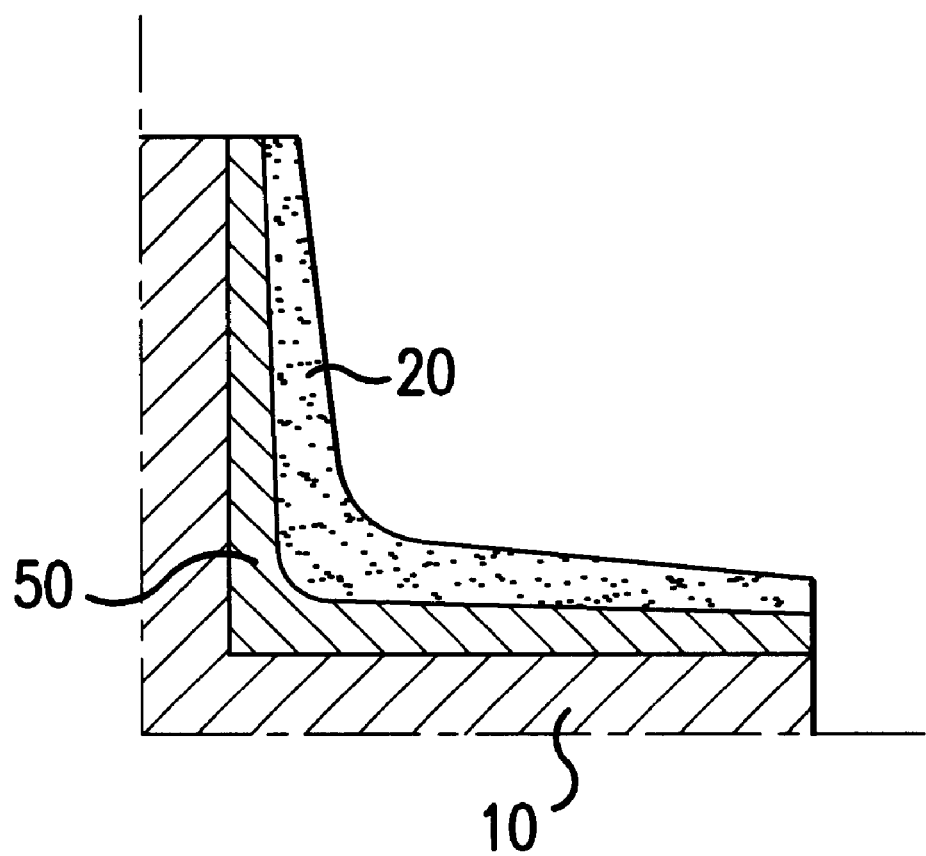
FIG. 9 is a sectional view showing a quarter of one cell of an exhaust gas emission purifying catalyst according to a seventh embodiment of the present invention.

Specifically, as shown in FIG. 9, the exhaust gas emission purifying catalyst according to the present embodiment is comprised of a cordierite carrier 10, an inhibiting layer 50 supported on the carrier 10, and a catalyst layer 20 formed on the outer surface of the inhibiting layer 50. The structures of the catalyst layer 20 and the inhibiting layer 50 are identical to those of the sixth embodiment, and therefore, a description thereof is omitted herein.

The exhaust gas emission purifying catalyst according to the present embodiment is manufactured by dipping the cordierite carrier 10 in a slurry including powders comprised mainly of zirconium silicate, for example, and then drying and sintering the cordierite carrier 10.

When the exhaust gas emission purifying catalyst is used, the inhibiting layer 50 surely inhibits the occluding agents added to the catalyst layer 20 from penetrating the carrier, and inhibits formation of a chemical compound caused by reaction of the occluding agents with carrier components. This prevents the carrier from cracking and prevents deterioration of the durability of the catalyst. In other respects, the present embodiment is identical with the first and sixth embodiments.

It should be understood, however, that there is no intention to limit the invention to the above-described first through seventh embodiments, and the invention is to cover all modifications.

For example, although, in the above-described embodiments, the honeycomb cordierite carrier 10 is used as the carrier, the present invention may be applied to an exhaust gas emission purifying catalyst having a carrier formed of a material other than cordierite. For example, the use of a metal carrier prevents the occluding agents from splashing to thus prevent deterioration of the exhaust gas emission purifying performance of the catalyst and hardly causes penetration of the occluding agents into the carrier. If the honeycomb cordierite carrier is used, the cells of the cordierite carrier should not necessarily be quadrangular but may be triangular or hexagonal.

Further, although in the above-described embodiments, the zirconium silicate is used as the composite oxide mixed in the catalyst layer 20 or included in the inhibiting layer 50, a compound oxide comprised of silicon and at least one metal selected from a transmission metal group comprised of cobalt, zirconium, iron, and manganese may be used.

Further, although, in the above-described sixth and seventh embodiments, the catalyst layer includes no composite oxide, the catalyst layer may include a composite oxide.

Further, the number and positions of inhibiting layers should not be restricted to those of the sixth and seventh embodiments. For example, the inhibiting layer may be formed between the carrier and the catalyst layer, and another inhibiting layer may be formed over the catalyst layer.

Further, the exhaust gas emission purifying catalyst may be constructed such that two or more layers selected arbitrarily from the second catalyst layer, the three-way catalyst layer, and the inhibiting layer in the second to seventh embodiments are combined with the catalyst layer.

What is claimed is:

1. An exhaust gas emission purifying catalyst, comprising:
    a carrier; and
    a catalyst layer containing at least one metal selected from a group including alkali metals and alkaline earth metals,
    wherein a composite oxide including silicon (Si) and at least one metal selected from a transition group metal consisting of cobalt (Co), zirconium (Zr), iron (Fe), and manganese (Mn) is mixed in said catalyst layer.

2. An exhaust gas emission purifying catalyst according to claim 1, wherein said composite oxide is zirconium silicate ($ZrSiO_4$).

3. An exhaust gas emission purifying catalyst according to claim 1, further comprising:
    a second catalyst layer containing at least one metal selected from a group consisting of alkali metals and alkaline earth metals.

4. An exhaust gas emission purifying catalyst according to claim 1, further comprising:
    a second catalyst layer formed between said catalyst layer and said carrier,
    wherein at least one metal selected from a group consisting of alkali metals and alkaline earth metals is added as an occluding agent to said catalyst layer.

5. An exhaust gas emission purifying catalyst according to claim 1, further comprising:
    a three-way catalyst layer formed over said catalyst layer.

6. An exhaust gas emission purifying catalyst according to claim 5, wherein at least one material selected from an acidic material group consisting of silica ($SiO_2$), tungsten (W), and phosphorus (P) is mixed in said three-way catalyst layer.

7. An exhaust gas emission purifying catalyst according to claim 5, wherein said three-way catalyst layer contains no occluding agent.

8. An exhaust gas emission purifying catalyst according to claim 1, further comprising:
    a three-way catalyst layer formed between said catalyst layer and said carrier.

9. An exhaust gas emission purifying catalyst according to claim 8, wherein at least one material selected from an acidic material group consisting of silica ($SiO_2$), tungsten (W), and phosphorus (P) is mixed in said three-way catalyst layer.

10. An exhaust gas emission purifying catalyst according to claim 8, wherein said three-way catalyst layer contains no occluding agent.

11. An exhaust gas emission purifying catalyst according to claim 1, wherein a quantity of the composite oxide to be supported by 1 liter of said carrier is about 0.1 to 50 g.

12. An exhaust gas emission purifying catalyst according to claim 11, wherein said catalyst layer contains platinum and palladium as noble metals, and potassium and barium as NOx occluding agents, and respective quantities of platinum and the palladium to be supported by 1 liter of said carrier are about 0.1 to 10 g, and respective quantities of the potassium and the barium to be supported by 1 liter of said carrier are about 0.1 to 50 g.

13. An exhaust gas emission purifying catalyst according to claim 1, wherein a cordierite carrier is used as said carrier.

14. An exhaust gas emission purifying catalyst, comprising:
    a carrier;
    a catalyst layer containing at least one metal selected from a group consisting of alkali metals and alkaline earth metals; and
    an occluding agent movement inhibiting layer containing a composite oxide consisting of silicon (Si) and at least one metal selected from a transition group metal comprised of cobalt (Co), zirconium (Zr), iron (Fe), and manganese (Mn).

15. An exhaust gas emission purifying catalyst according to claim 14, wherein said composite oxide is zirconium silicate ($ZrSiO_4$).

16. An exhaust gas emission purifying catalyst according to claim 14, wherein a cordierite carrier is used as said carrier.

* * * * *